United States Patent [19]

Long

[11] Patent Number: 4,697,761
[45] Date of Patent: Oct. 6, 1987

[54] HIGH ALTITUDE RECONNAISSANCE PLATFORM

[76] Inventor: David E. Long, 6666 Glade Ave., Apt. 217, Canoga Park, Calif. 91303

[21] Appl. No.: 776,425

[22] Filed: Sep. 16, 1985

[51] Int. Cl.$^4$ .............................................. B64D 27/24
[52] U.S. Cl. ................................... 244/62; 244/53 R; 244/58; 244/45 R
[58] Field of Search ............. 244/62, 53 R, 13, 45 A, 244/DIG. 1.4, 45 R, 89, 58, 59

[56] References Cited

U.S. PATENT DOCUMENTS

| | | | |
|---|---|---|---|
| 1,058,983 | 4/1913 | Kikut | 244/45 R |
| 1,839,194 | 1/1932 | Blondin | 244/45 A |
| 4,361,297 | 11/1982 | Pommereau et al. | 244/97 |
| 4,415,133 | 11/1983 | Phillips | 244/13 |

OTHER PUBLICATIONS

"A Radiation Thermoelectric Power Converter", L. W. Lemley, The Naval Research Laboratory, Wash., D.C.

"Sun Powered High Flyer", A. Fisher, *Popular Science*, Feb. 1983.

"Wings in the Sun: The Evolution of Solar Challenger", M. Cowley, Flight International, 13 Jun. 1981, pp. 1865-1868.

*Primary Examiner*—Joseph F. Peters, Jr.
*Assistant Examiner*—Rodney Corl
*Attorney, Agent, or Firm*—Poms, Smith, Lande & Rose

[57] ABSTRACT

A high altitude, ultra lightweight aircraft has broad area relatively flat wings, and is provided with solar cells on its upper wing surfaces, and long wavelength, infrared responsive cells on its lower wing and fuselage surfaces, to provide enough power to maintain the aircraft aloft at high altitudes indefinitely. The aircraft is intended to fly at altitudes of about 60,000 feet to 110,000 feet, at speeds in the vicinity of 70 to 200 miles per hour. A battery or fuel cell and electrical system is provided to store excess electrical power and to supply electrical power when needed. A large, low speed, pusher propellor is driven by an electrical motor. The aircraft may be launched with an opaque balloon, which not only raises the aircraft to the desired elevation but also conceals it.

17 Claims, 11 Drawing Figures

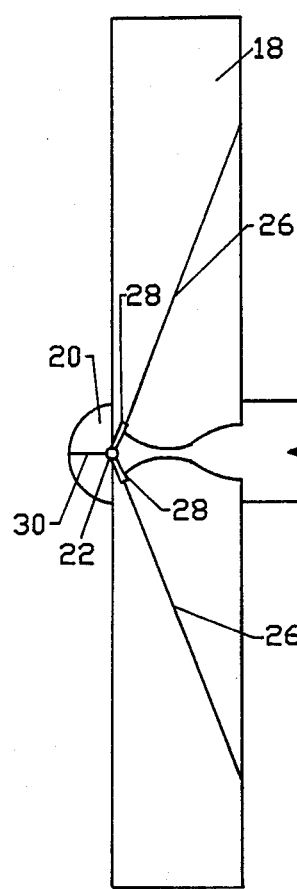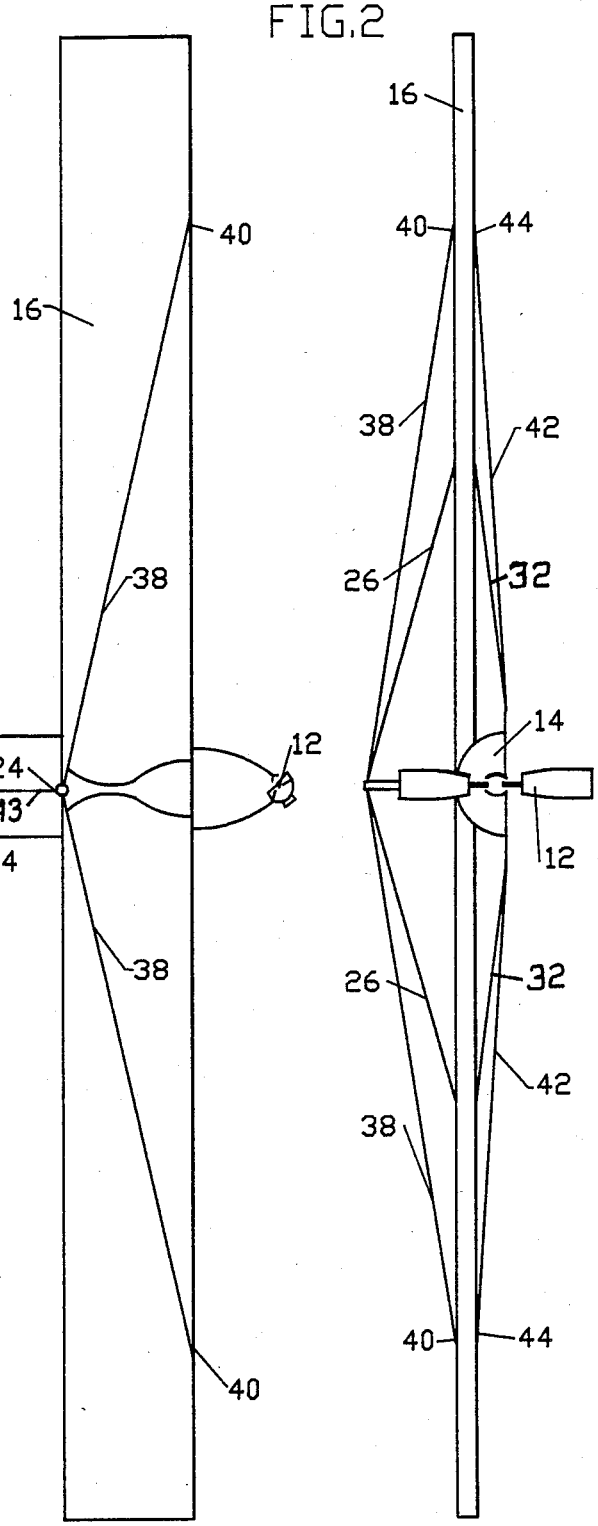

HIGH ALTITUDE RECONNAISSANCE PLATFORM

FIELD OF THE INVENTION

This invention relates to high altitude, ultra lightweight aircraft.

BACKGROUND OF THE INVENTION

It has long been considered desirable for governmental and commercial purposes to have a high altitude "platform" from which a payload (e.g. radiation sensors or other devices) can operate.

It has previously been proposed to power aircraft by solar cells, and U.S. Pat. No. 4,415,133 is directed to such an aircraft. Other solar cell powered aircraft have also been proposed. However, although the energy provided by solar cells is adequate to power lightweight aircraft while they are in the sunlight, it is inadequate to provide sufficient power to store in batteries, rechargeable fuel cells, or the like, so that a solarpowered aircraft can remain in the air day and night for prolonged periods of time.

Another proposal for a high altitude platform involved the U.S. Navy HI-SPOT blimp or balloon project. Apparently, some consideration was given to the possibility of using Long Wave Infrared Radiation (LWIR) from the earth to provide continuous power to such a blimp or balloon. An article discussing this possibility is entitled "A Radiation Thermoelectric Power Converter", L. W. Lemley, Naval Research Laboratory, pages 20 through 26, Symposium Report. It is understood that the possibility of using LWIR to power the blimp or balloon continuously, has not been implemented.

Accordingly, a principal object of the present invention is to provide an aircraft which is capable of staying aloft at high altitudes day and night for many months, or even years.

Another problem is the launching of a low power, high altitude, lightweight structure, aircraft and implementing ascent to the desired altitudes of 60,000 to 110,000 feet.

Another object of the present invention is to launch such an aircraft, and to accomplish the launch in secrecy.

SUMMARY OF THE INVENTION

In accordance with the present invention, an ultralight, high altitude aircraft is provided with a large propellor designed to operate at a relatively low rate of rotation, an electric motor coupled to the propellor, and broad area, relatively flat, wings having arrays of solar cells on their upper surfaces, and arrays of LWIR responsive electric generating cells on their lower surfaces.

A further aspect of the invention involves the electric circuitry including batteries or rechargeable fuel cells for storing excess electrical power during bright sunlight portions of the day when the solar cells are fully operative, and supplementing the output of the LWIR cells during intervals of the night or day when the electrical outputs from the solar and LWIR cells are insufficient to fully power the electric motor.

Concerning the aircraft construction, it may assume any of a number of configurations, wherein the structure is ultralight, and the wing surfaces are very extensive for the overall weight of the aircraft, to provide broad upper surfaces for the solar cells and broad lower surfaces for the LWIR cells. The aircraft preferably has two wings, with a main wing located near the rear where the pusher propellor is mounted and a smaller second wing mounted near the front of the aircraft, providing additional surface area for the cells. The plane is designed to fly at a speed of between about 70 to 200 miles per hour at an altitude of between about 60,000 feet and 110,000 feet. Accordingly, the pusher propellor has a relatively large surface area, is formed of a fairly thin vane to minimize its weight, and the propellor changes in pitch with radial distance from its hub in view of the higher velocity through the air at the outer end of the propellor than near its central hub. Orientation of the aircraft is controlled by flexing wing surfaces, thus avoiding complex or weighty control structures.

Concerning one minor aspect of the invention, the lower surface of the fuselage may be flat, to facilitate mounting of LWIR cells, and the reception of energy from the earth onto these cells.

In accordance with another aspect of the invention, the aircraft may be launched, or elevated to a suitable altitude within an opaque balloon to conceal the aircraft as well as carry it aloft.

As one specific arrangement for supporting and launching the aircraft, the balloon may have a diameter substantially greater than the maximum dimension of the aircraft, and also include arrangements for reefing or closing the lower end of the balloon, below the point where the aircraft is supported. Then, when the aircraft is to be separated from the balloon, the lower end of the balloon is first unreefed, or opened and then, after a brief delay, the aircraft is released from the balloon, so that it will fall free of interference with the balloon.

Other objects, features and advantages of the aircraft will become apparent from a consideration of the following detailed description, and from the accompanying drawings.

BRIEF DESCRIPTION OF THE DRAWINGS

FIG. 1 is a top plan view of a high altitude ultralightweight aircraft illustrating the principles of the present invention;

FIG. 2 is a rear view of the aircraft of FIG. 1 showing the pusher propellor in the foreground;

DETAILED DESCRIPTION

Before describing the drawings in detail, a brief statement of the nature of the aircraft is appropriate, in order to fully understand the principles behind the aircraft design. The aircraft is intended for relatively high altitudes and very low velocities, and is ultralight in its structural configuration. More specifically, it is intended to fly at an altitude of between about 60,000 and 110,000 feet, and to have a cruising velocity of about 100 to 300 feet per second, or about 70 to 200 miles per hour. When adequate energy is available, as during summer months when there is more sunlight to energize the solar cells, the velocity may be increased up to 200 miles per hour for example, and the aircraft altitude to over 100,000 feet. The nominal horsepower at the propellor is approximately 14.8, corresponding to 11.0 kilowatts. The altitude of the aircraft is controlled by the propellor revolutions per minute and the attitude of the aircraft is controlled by warping the forward wing, as will be described in greater detail hereinbelow. Power is provided by an array of solar cells which cover the upper surfaces of the two wings, and by a set of long wave infrared responsive electric generating cells which cover the lower surfaces of the relatively flat wings, and also the lower relatively flat surface of the fuselage of the aircraft. The power generated by these two arrays is substantially more than enough to power the aircraft, and excess energy generated during sunlight hours, is stored in a battery, or rechargeable fuel cells, to supplement the long wave infrared radiation generating cells, during night-time hours. It is contemplated that the received radiation will normally be adequate to provide sufficient power for the plane to fly in the upper end of the range of speeds and altitudes indicated herein, and this will be accomplished by supplying higher levels of power to the propellor.

Now that some of the background principles have been set forth, attention will be directed to the accompanying drawings.

Figure 3:
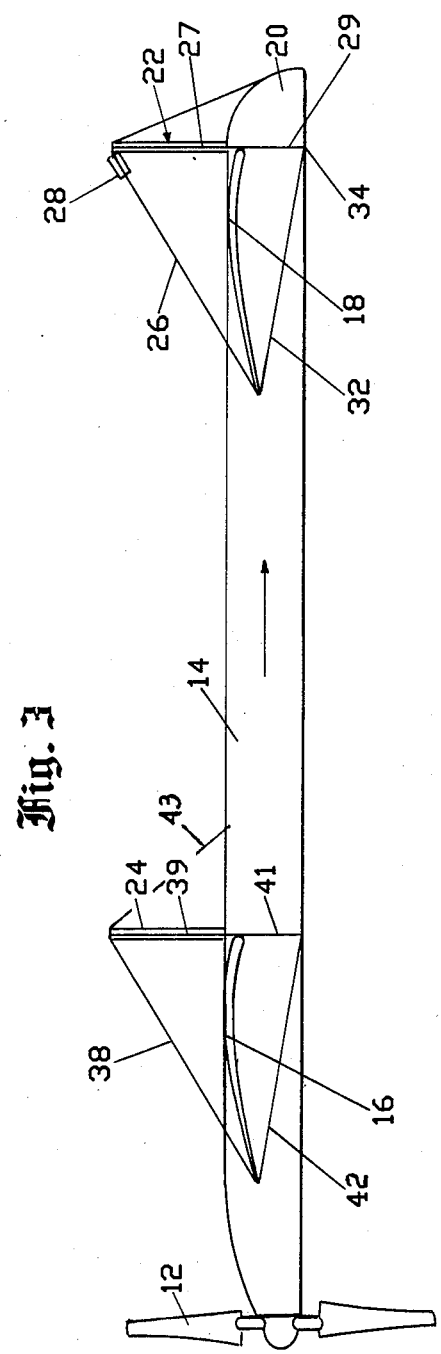
FIG. 3 is a side view of the aircraft of FIGS. 1 and 2.

Referring now to FIGS. 1, 2 and 3 of the drawings, the aircraft includes a pusher propellor 12 mounted toward the rear of the fuselage 14. The aircraft is provided with a main wing 16 mounted to the rear of the fuselage 14 adjacent the pusher propellor 12, and a shorter forward wing 18 mounted close to the front 20 of the fuselage 14. The wing span of the rear wing is approximately 120 feet, and that of the front wing is approximately 72 feet, with both of the two wings having substantially the same constant width or chord, equal to approximately 12.8 feet. In each case, it is to be understood that the specific dimensions, weights, speeds, altitudes and the like are representative for one preferred embodiment of the invention, and various departures from these specific dimensions are contemplated, all within the spirit and scope of the generalized invention as described in this specification.

To provide additional bracing and stiffness for the wings 16 and 18, brace posts 22 and 24 are provided. Upper guy wires 26 are connected from the top of brace post 22 through the tensioning devices 28 (see FIG. 1) to the rear edges of the wing 18. A front upper guy wire 30 is connected from the brace post 22 to the front end of the aircraft. Lower guy wires 32 are connected from the rear edges of the wing 18 to the bottom of the housing 14.

The tensioning devices 28 are connected between the inboard ends of the brace wires 26, and the brace supporting post 22. The tensioning devices 28 may be of any desired electrically operated type, and may be in the form of a motor-driven threaded shaft which, when operated, shortens the effective distance between the post 22 and the point on the wing 18 where the wire 28 is connected. With one of the two wires 26 being shortened, and the other being loosened, the net effect will be to wrap the front wing and cause the aircraft to turn in the direction indicated by the stay wire which is being loosened, and away from the direction of the stay wire which is being tightened.

Concerning the bracing for the rear wing 16, the two upper guy wires 38 are connected from the brace post 24 to the rear edges of the wing 16 at the points designated 40. Rear brace wires 42 extend from the bottom of the fuselage 14 to the points 44 toward the outer ends of the wing 16.

Additional guy wires 27 and 29 are connected from bracing post 22 and from the bottom of the fuselage, respectively, to the front edges of front wing 18 near the outer ends thereof, and similar corresponding guy wires 39 and 41 are provided for the rear wing 16, as shown in FIG. 3. Guy wires are also connected from the two brace poles and from the bottom of the fuselage to the leading edges of the two wings. Guy wire 43 is connected from the top of brace post 24 to the fuselage toward the front of the aircraft from post 24.

Figure 4:
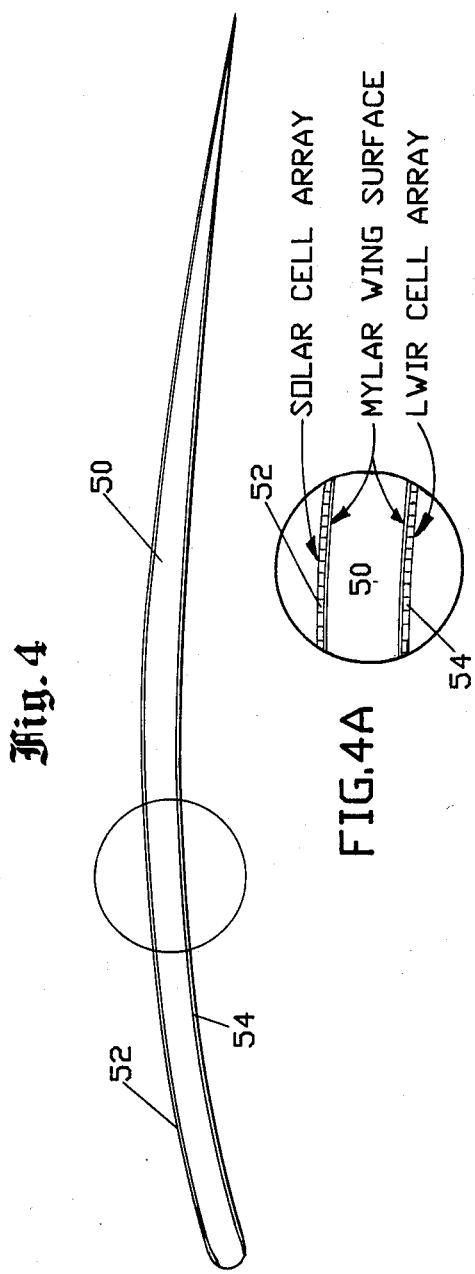
FIG. 4 is a cross-sectional view of a typical wing cross section, which may be either the front or rear wing of the aircraft.
Figure 4A:
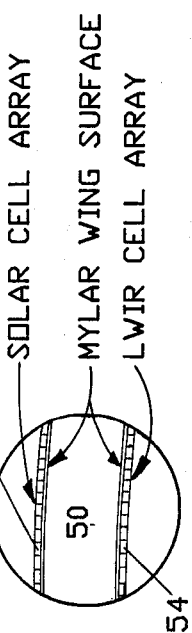
FIG. 4A is an enlarged showing of a portion of FIG. 4 as indicated by the circle in FIG. 4.

FIG. 4 is an enlarged showing of the cross section of one of the wings, and FIG. 4A is a further enlarged view of a section of the wing of FIG. 4. For convenience, the reference numeral 50 is employed to refer to the wing cross section shown in FIG. 4. However, it is noted that the wing cross section is substantially the same for both the front and rear wings, and the chord or distance from the front to the rear edge of the wings 16 and 18, remains substantially the same for the entire span of the wings. At the very low aircraft velocities involved in the present aircraft, the tapering of the wings surfaces at their outer ends is not required. Further, it is desirable to provide large relatively uniform, and fairly flat areas for receiving the solar cell arrays 52 which are mounted on the upper surface of the wing configurations shown by reference numeral 50 in FIGS. 4 and 4A. Similarly, the array 54 of long wave infrared radiation electric generation cells 54 is provided with broad area surfaces on the bottom of the wing configuration 50. Incidentally, the solar panels mounted on the upper surfaces of the wings have a total area of about 2,560 square feet. The long wave infrared cell panels are mounted both on the lower surface of the wings, and also on the flat lower surface of the fuselage 14, and have a combined area of approximately 3,048 square feet.

The air frame structure is formed of kevlar spars and stringers, as well as ribs, and has a mylar external envelope which may be 0.002 inch thick, for example. The aircraft materials and spar and stringer arrangements are of the configuration employed heretofore in known ultra lightweight aircraft. The arrays of solar cells and LWIR cells, are mounted directly on the outer surface of the mylar. Incidentally, the solar cells are preferably made of "n" and "p" type gallium arsenide, having a somewhat higher efficiency than silicon solar cells. The LWIR cells are preferably made of mercury-cadmium telluride, with junctions of n-type and p-type semiconductive material again being employed in a manner similar to the arrays of solar cells.

Figure 5:
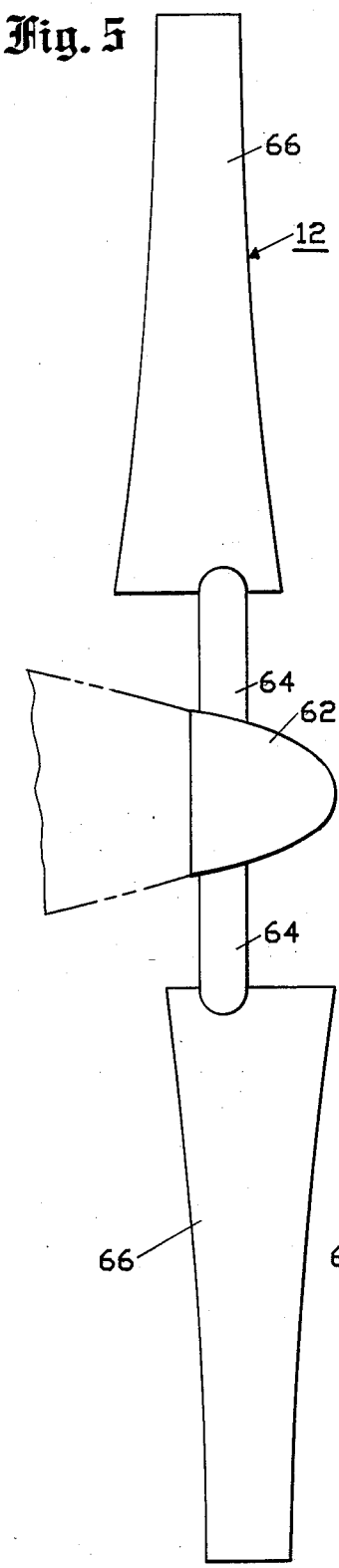
FIG. 5 is a side view of the pusher propellor which may be employed to power the aircraft.
Figure 6:
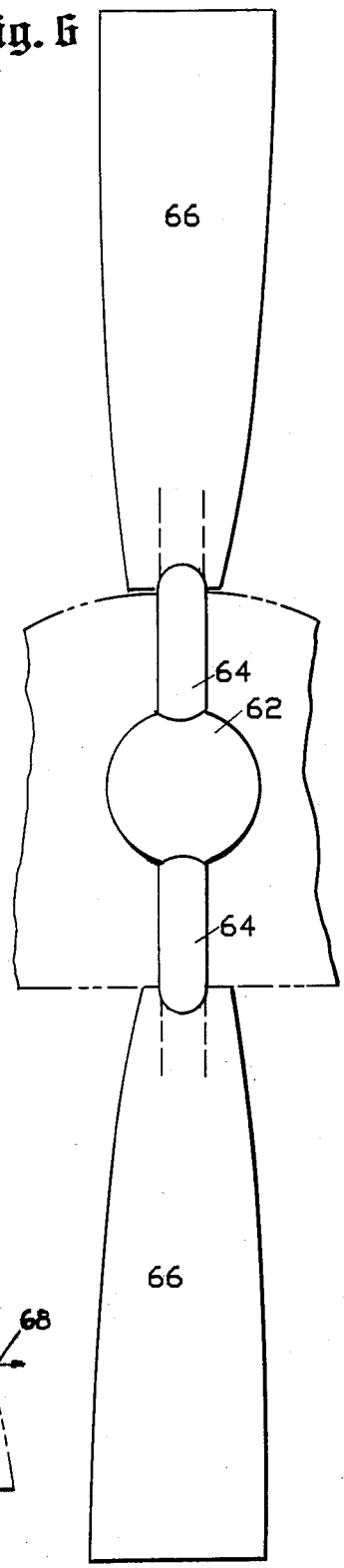
FIG. 6 is a view of the pusher propellor of FIG. 5 taken from the rear of the aircraft.
Figure 7:
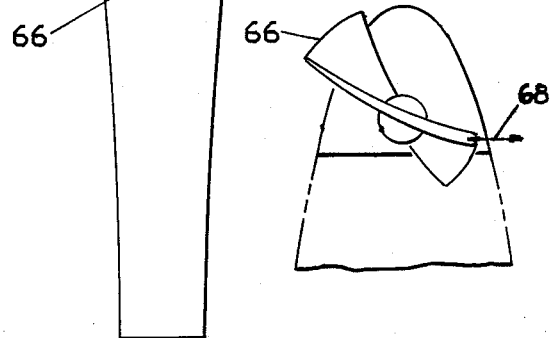
FIG. 7 is a view looking from the end of the propellor toward the hub and the tail cone of the aircraft.

FIGS. 5, 6 and 7 are of interest in showing the configuration of the propellor 12. It includes a rotating central hub 62, two tubular support members 64, and two constant width specially curved propellor blades 66 secured to the support members 64. The configuration of the propellor blades 66 may be noted from the curvature shown in FIG. 7, in which, for clarity, only one of the two blades of the propellor are shown. More specifically, with the outer ends of the propellor blades 66 travelling at a much greater speed through the atmosphere than the inner portions of the blades 66, the outer edges of the blade make a much smaller angle with respect to the direction of travel of the propellor, indicated by arrow 68 in FIG. 7, than the surface of the portion of the blades 66 which are closer to the support members 64.

Concerning representative dimensions for the propellor, the distance across the entire propellor is 15.7 feet, with two blades of 5.85 feet each being mounted on Kevlar tubes 64 which are secured to hub 64. The chord of the propellor airfoil is two feet. When the aircraft is cruising at 176 feet per second at 90,000 feet altitude, the propellor data would include the following: rotation speed, 10.35 revolutions per second; tip velocity, 510 feet per second; torque, 125 foot-pounds; and horsepower, 14.8 corresponding to 11.0 kilowatts.

Figure 8:
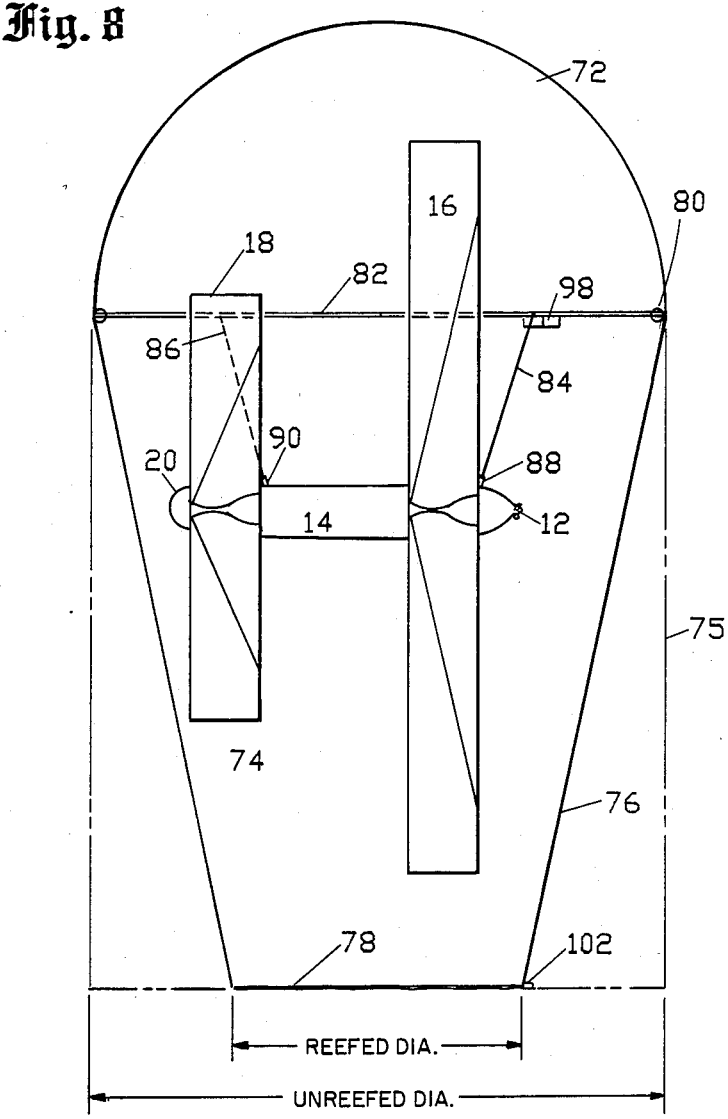
FIG. 8 is a side view of a launch arrangement including a reefed balloon for concealing the aircraft and raising it to the desired operating altitude.

Attention will now be directed to FIG. 8 in which the balloon launch arrangements for the aircraft are disclosed. The balloon of FIG. 8 has a generally spherical or curved upper portion 72, and a lower portion 74 which may be of a substantially right cylindrical configuration as indicated at reference numeral 75 when fully opened, but which may be reefed into the tapered shape shown at 76 in FIG. 8 with the lower end 78 of the balloon being held together by any appropriate sealing arrangements which may be readily released. Secured to the balloon 72 is a lightweight structural ring 80 having a cross member 82 to which the aircraft is secured by cables 84 and 86. Secured to the lower ends of the cables 84 and 86 are solenoids 88 and 90 having plungers which each engage a ring secured to the aircraft.

Figure 8A:
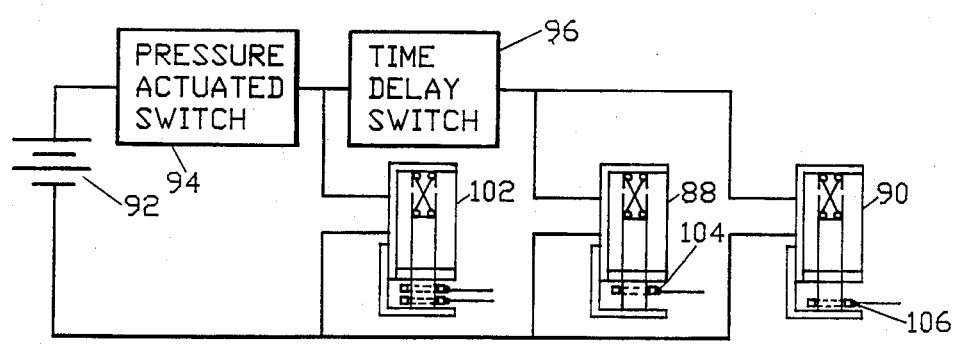
FIG. 8A is an electrical circuit employed in the initiation of the launch or separation of the aircraft from the balloon.

The circuit of FIG. 8A is mounted in the balloon assemblage of FIG. 8. More specifically, the battery 92, the pressure-actuated switch 94, and the time delay switch 96, are mounted in the unit 98 shown supported by the structural member 82 in FIG. 8. In operation, when the balloon reaches a pre-scheduled altitude such as 80,000 feet, for example, the pressureactuated switch 94 is operated, to connect the battery 92 to the solenoid 102, to release the reefing arrangements which hold the lower end of the balloon in the reefed configuration shown in FIG. 8. The balloon will then expand at its lower end to the diameter shown at 75, designated "unreefed" diameter, in FIG. 8. After a delay of a period of time sufficient for the balloon to change to the unreefed configuration, perhaps one-half minute, the time delay switch 96 will close, operating the two solenoid plunger-type electromagnets 88 and 90, releasing the rings 104 and 106 which are secured to the aircraft, and permitting the aircraft to fall free through the open unreefed and enlarged end of the balloon 72. The aircraft has a stable aerodynamic configuration, and will soon assume a substantially level configuration with the pusher propellor 12 providing power to the aircraft.

Figure 9:
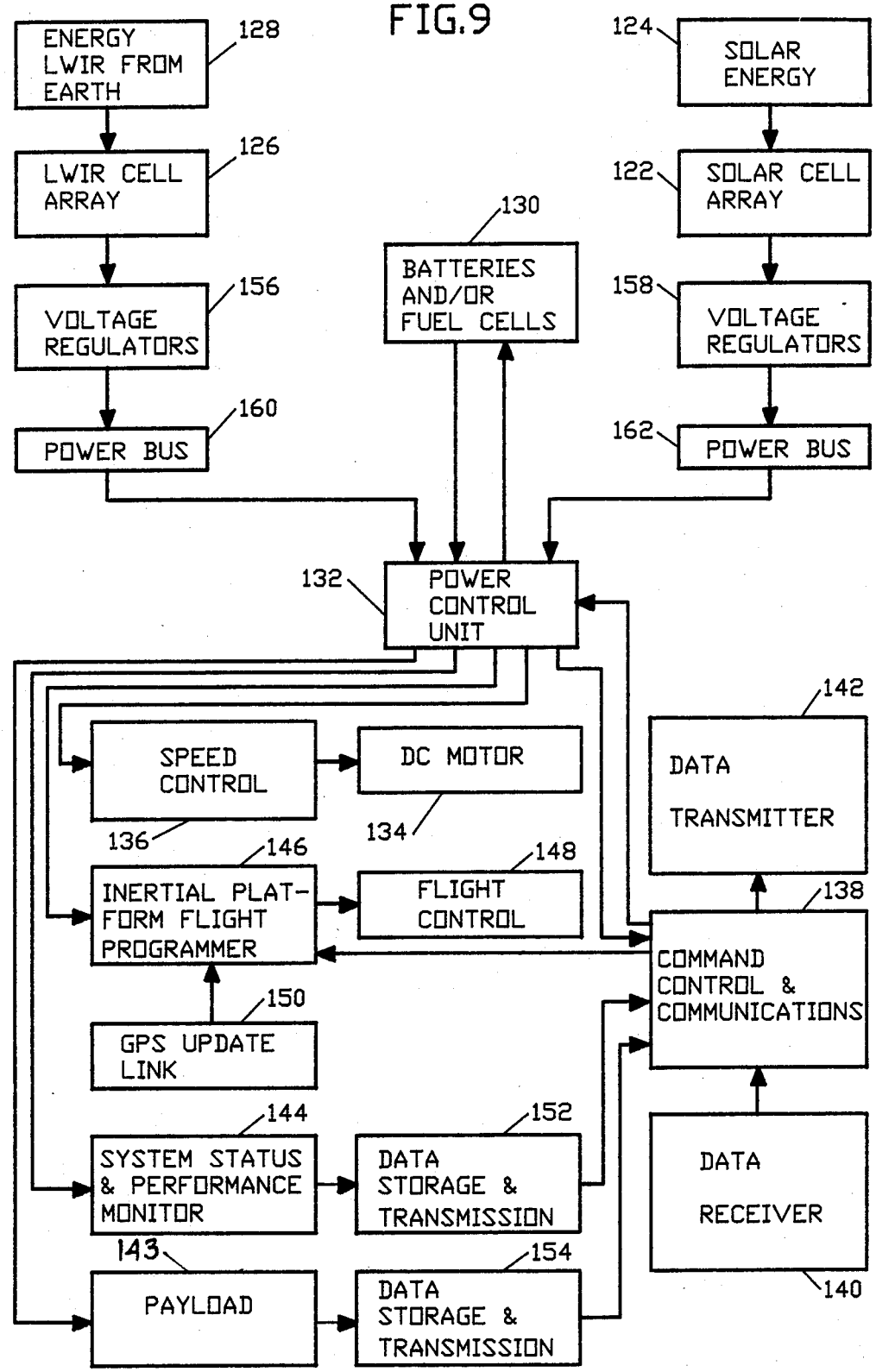
FIG. 9 is a block circuit diagram indicating the power arrangements for the illustrated aircraft.

FIG. 9 of the drawings is a block circuit diagram showing the sources of power, and the various sytems which require power in the present aircraft. To the right in FIG. 9 is shown the solar cell array 122, with the incident solar energy being indicated by the block 124. Similarly, to the left in FIG. 9 is the LWIR or long wave infrared cell array 126, with the radiated infrared energy from the earth's albedo, being indicated by the block 128. Also shown in FIG. 9 is the block 130 indicating the batteries and/or fuel cells which are employed for storing excess electrical energy. Incidentally, this condition will normally arise when there is bright sunlight being received by the solar cell array 122, so that, in combination with the LWIR cell output, the power received at the power control unit 132 will be substantially more than is required to power the DC motor 134, which is energized through the speed control circuit 136. The functions and the control of the aircraft are determined by the command control and communications unit designated 138 in FIG. 9. Conventional UHF, VHF, or other antennas are provided, and data is periodically received from a ground control station as indicated by the receiver 140, and the transmission of signals from the aircraft to the ground control station is indicated by the transmitter 142. Incidentally, modulated laser beams could be employed instead of, or in addition to high frequency radio signals. Other systems which are powered as required by the power control unit 132 include the payload 143, the system status and performance monitor circuitry 144, and the inertial platform flight programmer 146. The flight control circuit 148 involves the circuitry for operating the tensioning devices 28 as shown in FIG. 1 of the drawings, and which selectively tension or loosen the stays 26 so that the surfaces of the front wing 18 will be modified to control the direction in which the aircraft is heading. The block 150 is the GPS, or global position system up-date length. In this regard, it is noted that the location of the aircraft as determined by the inertial platform will tend to drift to some extent with the passage of time; accordingly, corrections are applied to update the position of the aircraft through the global position system update. The data storage and transmission circuits 152 and 154 are employed to store the outputs from their associated circuits, and periodically supply information to the command control and communications unit 138, upon request. The voltage regulators 156 and 158 associated with the long wave infrared cell array and the solar cell array, respectively, could be combined with the power control unit 132. However, they may also be shown as separate circuits as in FIG. 9, and provide output voltages from the solar cell and the long wave solar cell array appropriate for utilization by the power control unit 132. The power buses 160 and 162 are employed to route the output power from the two arrays to the power control unit 132. The individual output leads from the power unit 132 to the various subsystems, permits the energization of these subsystems as needed. Thus, for example, if under adverse conditions, all of the power is temporarily required to keep the aircraft aloft, the command control unit 138 and the power control unit 132 may be programmed to supply all of the power to the speed control unit 136 and the DC motor 134. However, during normal operations, all of the other units would be powered at least periodically with the command control and communications unit 138 normally being supplied with the relatively small level of power needed to continue operation, and to permit the receipt of instructions from the ground based control station as indicated by the block 140.

Incidentally, the matter of the distribution of the weight of the aircraft is critical, and therefore the following figures for weight data are included:

| WEIGHT DATA (Lbs.) | |
| --- | --- |
| Fuselage | 47.6 |
| Front Wing | 55.3 |
| Rear Wing | 97.8 |
| LWIR Panels (3048 sq. ft.) | 294.0 |
| Solar Panels (2560 sq. ft.) | 317.8 |
| Brace Wires (Wing) | 18.5 |
| Brace Poles (Wing) | 14.1 |
| Flight Control | 10.0 |
| Guidance | 10.0 |
| Propellor | 50.5 |
| Motor and Transmission | 40.0 |
| Power Converters | 4.4 |
| Batteries or Fuel Cells | 100.0 |
| Payload | 100.0 |
| TOTAL AIRCRAFT WEIGHT | 1160.0 pounds |

Concerning the power generated by the LWIR cells and the solar cells, and the power requirements for the aircraft, the propellor requires 14.8 HP, or approximately 11.0 kilowatts for proper operation. There are 2560 sq. ft. of solar panels, and they generate 8.4 watts per sq. ft., for a total of 21.5 kilowatts power, when full sunlight is incident on the gallium arsenide solar cell array. Similarly, the LWIR panels generate 3.3 watts of power and there are 3,048 sq. ft. of LWIR panels, making a total of approximately 10.0 kilowatts generated by these LWIR panels. Accordingly, when the LWIR panels are operative, and no energy is being received from the solar cells, for example, at night, there is slightly less power generated than is desired for the propellor. Accordingly, during this period of time, the power output from the LWIR cells is supplemented by battery or fuel cell power to drive the propellors. However, in the daytime when the sunlight is incident on the solar cells, a total of 31.5 kilowatts is being generated, nearly three times that required for powering the aircraft. Accordingly, the batteries or fuel cells may be fully charged during this period of time, and additional energy is available to operate all of the aircraft systems.

For completeness, reference will now be made to a number of background articles and sources relating to the invention. Concerning the overall aircraft design, reference is made to a text entitled "Fluid Dynamics Drag", by Sighard F. Hoerner, published by the author, 1958, Dr. Ing. S. F. Hoerner 148 Basteed Drive, Midland Park, N.J., in which pages 6–11 and 7–14 are particularly pertinent. Concerning the propellor, attention is directed to Aircraft Propellor Design, by Fred E. Weick, First Edition, Twelfth Impression, McGraw-Hill Book Co., Inc. New York and London, 1930, in which note pp. 74–77 and FIGS. 39 and 40. With regard to the design configuration of Ultralight Weight airplanes, reference is made to the known construction of Paul McReady's Gossamer Condor and Albatross, to the MIT Monarch aircraft (see page 21 of the May 21, 1984 issue of Aviation Week and Space Technology) and to DuPont Company's Kevlar Design Standards Book. Typical statistics on balloon ascents are set forth in Aerospace America, July 1984, page 77 wherein the ascents to 60,000 feet and higher altitudes dating back to the 1930's are reviewed. With regard to solar cells, Lockheed and Hughes have published data indicating that conversion efficiencies of 16 to 18 percent have been obtained for gallium arsenide cells. Concerning LWIR cells, the inventor has been reliably informed that mercury cadmium telluride cells, yield an efficiency of approximately 12%.

In conclusion, it is to be understood that the foregoing detailed description and the accompanying drawings relate to one preferred illustrative embodiment of the invention. Various changes and alternatives may be employed. Thus, for example, one aerodynamic design has been selected for simplicity using two wings, both having substantially the same configuration and cross section, from one end of the wings to the other. This design has advantage of simplicity and ease in making calculations. However, other ultralight weight designs, having relatively flat upper and lower surfaces could also be employed. Also, instead of using a pusher propellor aircraft configuration, a conventional arrangement with the propellor in the front of the aircraft could be employed. Also, one particular arrangement of braces and stay wires was disclosed for keeping the wings somewhat more rigid. Of course, alternative wire and strut arrangements could be employed for accomplishing the same purpose. It is also noted that certain specific known materials for the LWIR array and for the solar panel array have been disclosed. It is to be expected, however, that improvements in solar cell and LWIR cell arrays will take place, and the present invention contemplates the use of these improved cell arrays, as they become available. Accordingly, the present invention is not limited to that precisely as shown in the drawings and described in the detailed description hereinabove.

What is claimed is:

1. A high altitude, ultralight aircraft requiring no fuel comprising:
    an aircraft having wings with broad area upper and lower wing surfaces,
    a low speed propellor mounted on said aircraft;
    electric motor means mounted on said aircraft and coupled to drive said propellor;
    solar cell means for receiving solar energy and supplying electricity to power said motor means, said solar cell means being mounted on the upper surfaces of said wings;
    long wavelength infrared (LWIR) responsive cell means for receiving albedo infrared energy from the earth and for supplying electricity to power said motor means, said LWIR cell means being mounted on the lower surfaces of said wings; and
    means for storing excess electrical energy supplied by said solar and LWIR cell means beyond that needed for powering said motor means, and for supplying supplemental electrical power to said motor means when the power supplied from said cell means is inadequate;
    whereby the aircraft may have a life at elevated altitudes of several years.

2. A high altitude, ultralight aircraft as defined in claim 1 further comprising opaque balloon means for raising said aircraft to the desired altitude, with the aircraft mounted within the balloon means.

3. A high altitude, ultralight aircraft as defined in claim 1 including front and rear wings, and means for deflecting at least one of said wings for controlling the flight of said aircraft.

4. A high altitude, ultralight aircraft as defined in claim 1 wherein said propellor is a low speed, large area propellor and said electric motor means powers said propellor solely from said solar cell means, said LWIR cell means and said storage means, to continuously drive said aircraft at a velocity of between 60 miles per hour and 200 miles per hour.

5. A high altitude, ultralight aircraft as defined in claim 1 wherein said aircraft has two wings having an effective upper surface area of at least 2400 square feet, and a substantially equal lower surface area.

6. A high altitude, ultralight aircraft as defined in claim 1 wherein said aircraft includes a fuselage, and wherein LWIR cell means are mounted on the bottom of said fuselage.

7. A high altitude, ultralight aircraft as defined in claim 6 wherein the bottom of said fuselage is substantially flat.

8. A high altitude, ultralight aircraft as defined in claim 1 further including means for transmitting signals from said aircraft, and means for receiving signals at said aircraft.

9. A high altitude, ultralight aircraft requiring no fuel comprising:
an aircraft having wings with broad area upper and lower wing surfaces;
solar cell means for receiving solar energy and producing electricity, said solar cell means being mounted on the upper surfaces of said wings;
long wavelength infrared (LWIR) responsive cell means for receiving albedo infrared energy from the earth and for producing electricity, said LWIR cell means being mounted on the lower surfaces of said wings;
means for the storage of excess electrical energy supplied by said solar and said LWIR cell means;
means for powering said aircraft to keep said aircraft aloft solely from the electricity from said solar cell means and said LWIR cell means, including means for supplementing the electrical power from said LWIR cells with power from said storage means at night, when no power is being generated by said solar cells; and
opaque balloon means for raising said aircraft to the desired altitude with the aircraft within said balloon means;
whereby the aircraft may remain aloft at elevated altitudes, day and night for extended periods of time.

10. A high altitude, ultralight aircraft as defined in claim 9 including front and rear wings, and means for deflecting at least one of said wings for controlling the flight of said aircraft.

11. A high altitude, ultralight aircraft as defined in claim 9 wherein said aircraft has two wings having an effective upper surface area of at least 2400 square feet, and a substantially equal lower surface area.

12. A high altitude, ultralight aircraft as defined in claim 9 wherein said aircraft includes a fuselage, and wherein LWIR cell means are mounted on the bottom of said fuselage.

13. A high altitude, ultralight aircraft as defined in claim 12 wherein the bottom of said fuselage is substantially flat.

14. A high altitude, ultralight aircraft as defined in claim 9 further including means for transmitting signals from said aircraft, and means for receiving signals at said aircraft.

15. A high altitude, ultralight aircraft as defined in claim 9 including a large, low speed, pusher propellor, and electric motor means for powering said propellor.

16. A high altitude, ultralight aircraft as defined in claim 9 further including power control means for receiving electricity from said solar cell means and said LWIR cells, for coupling electricity to and from said storage means, and for directing electricity to said aircraft powering means and to other systems on said aircraft.

17. A high altitude, ultralight aircraft requiring no fuel comprising:
an aircraft having wings with broad area upper and lower wing surfaces, and including both a rear wing and a front wing, said aircraft including a fuselage having a substantially flat lower surface;
means for deflecting at least one of said wings for controlling the flight of said aircraft;
low speed propellor means mounted for powering said aircraft;
electric motor means mounted on said aircraft and coupled to drive said propellor means;
solar cell means for receiving solar energy and supplying electricity to power said motor means, said solar cell means being mounted on the upper surfaces of said wings;
long wavelength infrared (LWIR) responsive cell means for receiving albedo infrared energy from the earth and for supplying electricity to power said motor means, said LWIR cell means being mounted on the lower surfaces of said wings and on the flat lower surface of said fuselage; and
means for storing excess electrical energy supplied by said cell means beyond that needed for powering said motor means, and for supplying supplemental electrical power to said motor means when the power supplied from said cell means is inadequate;
whereby the aircraft may have a life at elevated altitudes of several years.

* * * * *